US006577248B1

(12) United States Patent
Hjelmvik

(10) Patent No.: US 6,577,248 B1
(45) Date of Patent: Jun. 10, 2003

(54) VEHICLE PARKING CONTROL SYSTEM

(75) Inventor: Torbernt Hjelmvik, Järfälla (SE)

(73) Assignee: Modul-System Sweden AB, Järfälla (SE)

(*) Notice: Subject to any disclaimer, the term of this patent is extended or adjusted under 35 U.S.C. 154(b) by 0 days.

(21) Appl. No.: 09/869,874

(22) PCT Filed: Dec. 21, 1999

(86) PCT No.: PCT/SE99/02455

§ 371 (c)(1), (2), (4) Date: Jul. 7, 2001

(87) PCT Pub. No.: WO00/41142

PCT Pub. Date: Jul. 13, 2000

(30) Foreign Application Priority Data

Jan. 8, 1999 (SE) .............................................. 9900029

(51) Int. Cl.[7] .................................................. B60Q 1/48

(52) U.S. Cl. .............................. 340/932.2; 340/309.16; 340/539.13; 235/377; 368/90; 455/409

(58) Field of Search .............................. 340/932.2, 904, 340/988, 309.16, 539.13; 235/377, 384; 701/200, 213; 368/90, 92; 455/409, 414

(56) References Cited

U.S. PATENT DOCUMENTS

| | | | | | |
|---|---|---|---|---|---|
| 5,266,947 | A | * | 11/1993 | Fujiwara et al. | 340/932.2 |
| 5,905,247 | A | * | 5/1999 | Ilen | 235/384 |
| 5,940,481 | A | * | 8/1999 | Zeitman | 379/114 |
| 6,037,880 | A | * | 3/2000 | Manion | 340/932.2 |
| 6,102,285 | A | * | 8/2000 | Elias | 235/377 |
| 6,147,624 | A | * | 11/2000 | Clapper | 340/932.2 |
| 6,188,328 | B1 | * | 2/2001 | Ho | 340/932.2 |
| 6,249,233 | B1 | * | 6/2001 | Rosenberg et al. | 340/932.2 |

FOREIGN PATENT DOCUMENTS

| | | |
|---|---|---|
| SE | 507381 | 5/1998 |
| WO | WO 97/19568 | 5/1997 |
| WO | WO 98/30982 | 7/1998 |

* cited by examiner

*Primary Examiner*—Daniel J. Wu
*Assistant Examiner*—Davetta W. Goins
(74) *Attorney, Agent, or Firm*—Alfred J. Mangels

(57) ABSTRACT

A parking control system in which a mobile telephone is used to commence and to terminate parking of a vehicle within a parking zone. A parking system user sends a user-specific code to a parking system computer at the commencement of and at the termination of a parking period. A vehicle-specific code corresponding with the parked vehicle is stored in the computer upon commencement of a parking period. A portable parking control unit can read the vehicle-specific code from a parked vehicle and can establish communication with the parking system computer, which is informed of the parking zone concerned. When the control unit requests information concerning vehicles parked within a particular parking zone, the computer sends corresponding information relating to one or more additional parking zones that are geographically close to the parking zone in question.

18 Claims, 2 Drawing Sheets

VEHICLE PARKING CONTROL SYSTEM

BACKGROUND OF THE INVENTION

1. Field of the Invention

The present invention relates to a vehicle parking control system, and primarily to a car parking control system. More specifically, the invention relates to a parking system in which a mobile telephone can be used to commence and terminate a parking period.

2. Description of the Related Art

In cities there will be one or more vehicle parking companies that has/have parking meters, or so-called pay meters, distributed throughout the city or town in a number of different places, where streets and large parking areas are the most common places in this regard.

In recent times, it has become more and more usual to pay parking fees with different types of bankcard or cashcard as a supplement to coin payment. When a cashcard is used, the person parking a vehicle will draw the card through a cashcard reader on the pay meter.

One known payment system is designed so that the person parking a vehicle draws the cashcard through a card reader in the pay meter, and the pay meter stores the number of the cash card and the time at which the card was read.

The pay meter then prints out a parking ticket. This ticket is placed inwardly of the windshield, where it can be seen. When a person collects the car, the person must return to the pay meter and again draw the cashcard through the card reader. The parking meter then calculates the amount to be debited for the parking period and stores this amount together with the number of the cashcard to be billed.

A system is known in which parking at such parking places can be initiated and terminated with the aid of a mobile telephone. One such known system is described in International Application WO 93/20539, in which there is sent at the commencement and termination of a parking period via a mobile telephone a code that identifies the parking place used, a code which identifies the vehicle, and a code which is unique to the driver of the vehicle. It is suggested that a parking fee is billed via the standard telephone bill.

The number of identification items that must be used in this system are far too many. This means that the system takes too long to set up the mobile telephone call in commencing and terminating a parking period. The system is also awkward to use.

A much simpler system for parking with the aid of a mobile telephone is described in Swedish Patent Specification No. 9800888-1. According to that patent specification, data on a cashcard possessed by the user and accepted by the parking system as a means of payment, and at least one user-specific reference, are stored in and tied together in a database belonging to the parking company concerned.

A user-specific reference is preferably the telephone number of the telephone to be used when parking. The telephone number is sensed by the parking system computer when the telephone is coupled to a telephone number belonging to the parking system.

According to one embodiment, a user-specific reference in the form of a vehicle specific reference is comprised of a plastic card or some corresponding data carrier, where the reference is comprised of a machine readable code contained on the card. Alternatively, a vehicle specific reference may, of course, comprise the vehicle registration number.

In order to enable a check to be carried out to ascertain whether or not a parked vehicle has been entered in the parking system, the system may be designed to allow a parking attendant or traffic warden either to read the vehicle registration number or alternatively said machine readable code.

According to this latter patent specification, the parking attendants or traffic wardens are equipped with a portable communications unit which is in wireless connection with a parking company computer that contains information relating to those vehicles as to which parking has been commenced but not yet terminated. The communications unit may for instance be the control unit illustrated and described in Swedish Patent Specification 9700054-1. In this case, the parking attendant enters the relevant parking zone in the control unit and retrieves from the computer a so-called parked vehicle list in respect of the parking zone concerned, i.e. a list of the registration numbers of vehicles as to which commencement of a parking period has been reported. The control unit then compares the registration numbers of the parked cars with the parked car list and makes an indication when observing that a commenced parking period has not been reported.

When a user-specific reference in the form of a plastic card placed visibly in the vehicle is used instead of a registration number, the plastic card is read by means of the control unit and compared in a corresponding way with a list of plastic card codes showing that commenced parking of a vehicle has been reported.

The system described in Swedish Patent Specification No. 9700054-1 has several drawbacks. One problem with the system is that it is necessary for the parking attendants to constantly feed-in a parking zone when they consciously or unconsciously change parking zones in order to obtain a relevant parked-car list. A parking zone is normally a zone that has the same parking regulations, the same parking fees, etc., and which constitutes a unitary geographical area. Such a parking zone is normally attended by one or a few parking meters. As a result, the number of parking places in such a zone is limited to at most 50. It would be beneficial if the number of entries that parking attendants must make through the keypad of the control unit could be reduced.

Another side of the same problem is that the time taken to obtain information concerning those vehicles that have commenced parking but have not terminated parking is only a fraction of the total communication time between the control unit. Because this communication must be frequent, it is desirable to be able to reduce the total communication time.

The present invention solves these problems.

SUMMARY OF THE INVENTION

Accordingly, the present invention relates to a parking control system in which a mobile telephone can be used in connection with the commencement and termination of a vehicle parking period. A user sends at least one user-specific code to a parking system receiving computer via a mobile telephone or via a public switched telephone system. At the commencement of the parking period, the parking zone concerned is reported to the parking system. A machine-readable, vehicle-specific code is stored in said computer and is tied to the user-specific code. The system includes a control unit which mechanically reads the vehicle-specific code and communicates with said computer and retrieves a list that contains information relating to vehicles that have commenced a parking period but have not yet terminated parking within a relevant parking zone. When the control unit requests said information relating to vehicles parked, within a parking zone through the medium of said communication, the computer functions to transfer corresponding information relating to one or more parking zones that are geographically close to the parking zone concerned at the same time as the requested information is transmitted to the control unit.

BRIEF DESCRIPTION OF THE DRAWINGS

The invention will now be described in more detail partly with reference to an exemplifying embodiment thereof shown in the accompanying drawings, in which.

DESCRIPTION OF THE PREFERRED EMBODIMENTS

Figure 1:
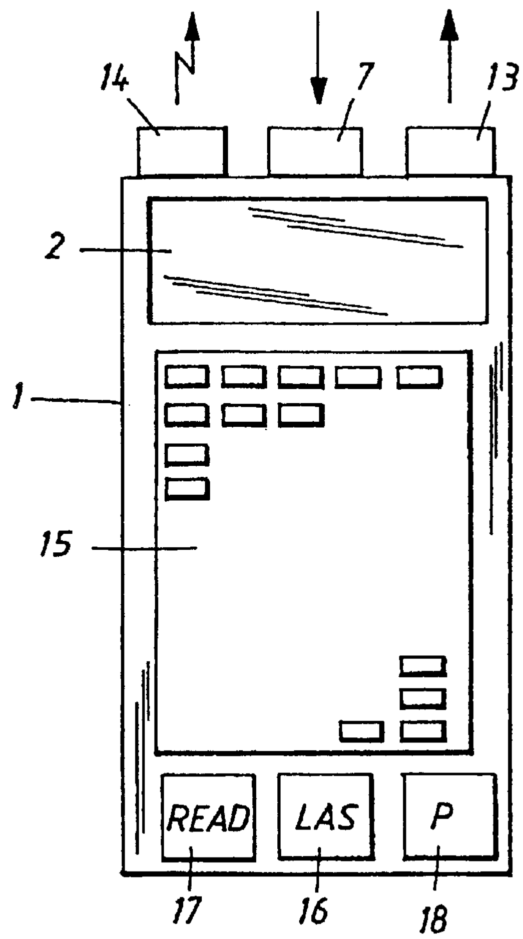
FIG. 1 illustrates a control unit.

FIG. 1 illustrates a portable parking control unit 1. The parking control unit may correspond in size to the size of a standard portable data terminal, for instance. The parking control unit 1 includes a display 2, a computer unit 3 with associated memory 4, and a communications unit 5 which is adapted to communicate with the database of the central computer 6 of the parking system, for receiving information concerning the registration numbers of those vehicles that have commenced parking in the parking system but have not yet terminated parking.

The parking control unit 1 also includes an optical reader 7 which when pointed at the number plate of a vehicle is able to read and clearly register the registration number. The computer 3 in the parking control unit is adapted to compare the indicated registration number with the registration numbers of cars in the system that have commenced parking but have not terminated parking, these numbers being stored in the memory 4.

The parking control unit includes a low power laser 13 which is adapted to function as a sight, wherewith a car park attendant or traffic warden aligns the control unit 1 with the center part of the vehicle number plate with the aid of the laser 13, and the optical read unit 7 then reads the vehicle number plate.

The optical read unit 7 may be of the same kind as that used in digital cameras, i.e. it includes a so-called CCD element. However, a scanning laser may be used instead.

The received optical signal is interpreted by the computer 3 with respect to the registration number of the vehicle, this number being stored in the computer memory 4.

The control unit may be equipped with an illuminating unit 14 which functions to light-up the vehicle number plate while reading the number.

The control unit is also equipped with a keypad 15 by means of which a vehicle registration number is entered manually.

The communications unit 5 is adapted to communicate with the central computer 6 of the parking company via radio transmission, preferably via a mobile telephone system as illustrated by the mast 12. However, communication can be affected via a GPRS network, a Tetra network or some other communications network.

Figure 2:
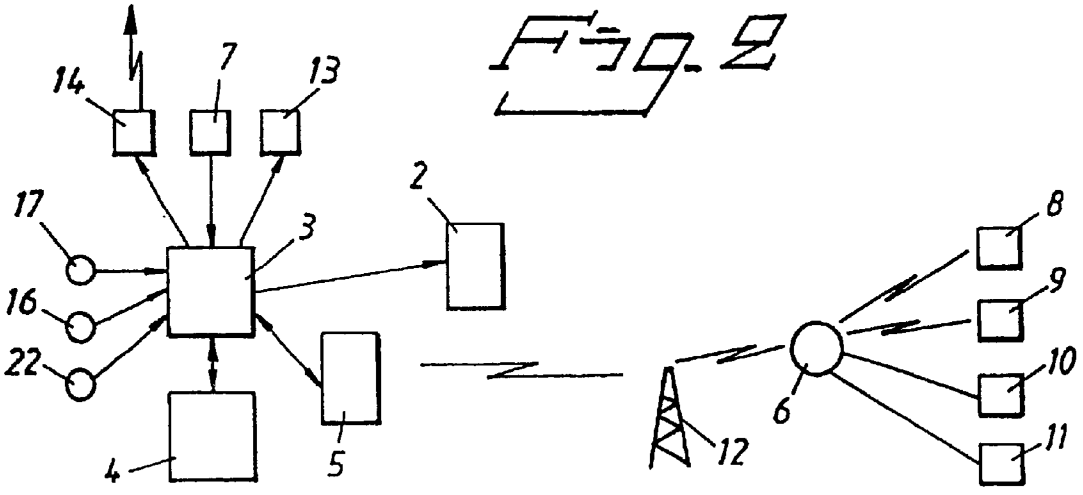
FIG. 2 is a block schematic illustrating the system.

FIG. 2 illustrates various telephones 8–11 which communicate with the central computer 6 to commence and terminate a parking period respectively. The transmission may be a wireless transmission, as illustrated with telephones 8 and 9, or may be accomplished over a public switched network, as illustrated by telephones 10 and 11.

The parking control unit 1 is operated by the car park attendant pressing, a button 16 to activate the laser 13, whereafter the laser is aimed at a vehicle number plate with the laser beam positioned in the center of said plate. The attendant then presses a button 17 so as to activate the scanning or reading device 7 and therewith read the vehicle registration number. The interpreted registration number is shown preferably on said display 2, so as to enable the attendant to check the correctness of the reading.

The control unit is also adapted to disclose through the medium of an indicating device whether or not the vehicle registration number belongs to a vehicle that has commenced a parking period but has not yet terminated parking in the system. This indicating device will suitably comprise a display.

The aforedescribed features of the control unit will be evident from the aforesaid Swedish Patent Specification No. 9700054-1.

In the simplest case, data belonging to a cashcard, a telephone number and the registration number of a vehicle are tied together in the database of the computer 6 of the parking system.

When commencing parking, the user need only call the computer of the parking system and state the identity of the parking zone in question. The parking system computer 6 senses the telephone number of the calling telephone, and the registration number of the vehicle concerned is identified in the computer database. Parking of the vehicle then commences.

In order to enable the parking zone concerned to be identified, each parking zone may for instance be provided with a unique number which constitutes the telephone number that the user shall use in coupling his telephone with the system computer. Each zone may be provided with a number for standard parking and one number for local residents' parking. Other systems are also conceivable, for instance a system in which the user calls a direct number to the parking system computer and then enters a unique parking-zone number in the telephone.

The unique parking zone number will conveniently be shown on signs, such as a sign in the proximity of coin-operated or cashcard-operated parking meters.

When terminating a parking period, the user again calls the computer 6 which therewith senses the telephone number. The computer senses the database, which shows that parking was commenced at an earlier time.

The computer 6 calculates the parking fee on the basis of the length of the parking time and the parking zone and the type of parking concerned. The computer then ties the parking fee to the cashcard which is tied to the telephone number of the user, whereafter the cashcard company concerned bills the cashcard owner, i.e. the user.

A vehicle included in a telephone parking system will suitably be provided with a decal or some corresponding device, so that a parking attendant will easily be able to see whether or not the vehicle can be checked mechanically.

The control unit 1 is thus adapted to allow the vehicle-specific code to be read mechanically and to communicate with said computer 6 and therewith retrieve a list containing information as to those vehicles that have commenced but not terminated parking within the parking zone concerned.

When the control unit 1 requests information relating to vehicles parked in a parking zone 20 (see FIG. 3) through the medium of said communication, the computer 6 functions to send corresponding information relating to one or more parking zones 21–25 that are geographically close to the parking zone 20 at the same time as the requested information is sent from said computer 6 to the control unit 1, all in accordance with the invention.

According to one highly preferred embodiment of the invention, the control unit functions to compare the vehicle specific code read by said unit with the list stored in said control unit and to send the code to said computer 6 when the code is not found on the list. In this case, the computer 6 functions to check whether or not the code is listed as parked in another parking zone and if such is the case to send the list relating to this other parking zone to the control unit.

Of course, it is possible to command the parking attendant to enter through the keypad 15 the zone in which the attendant is located.

Figure 3:
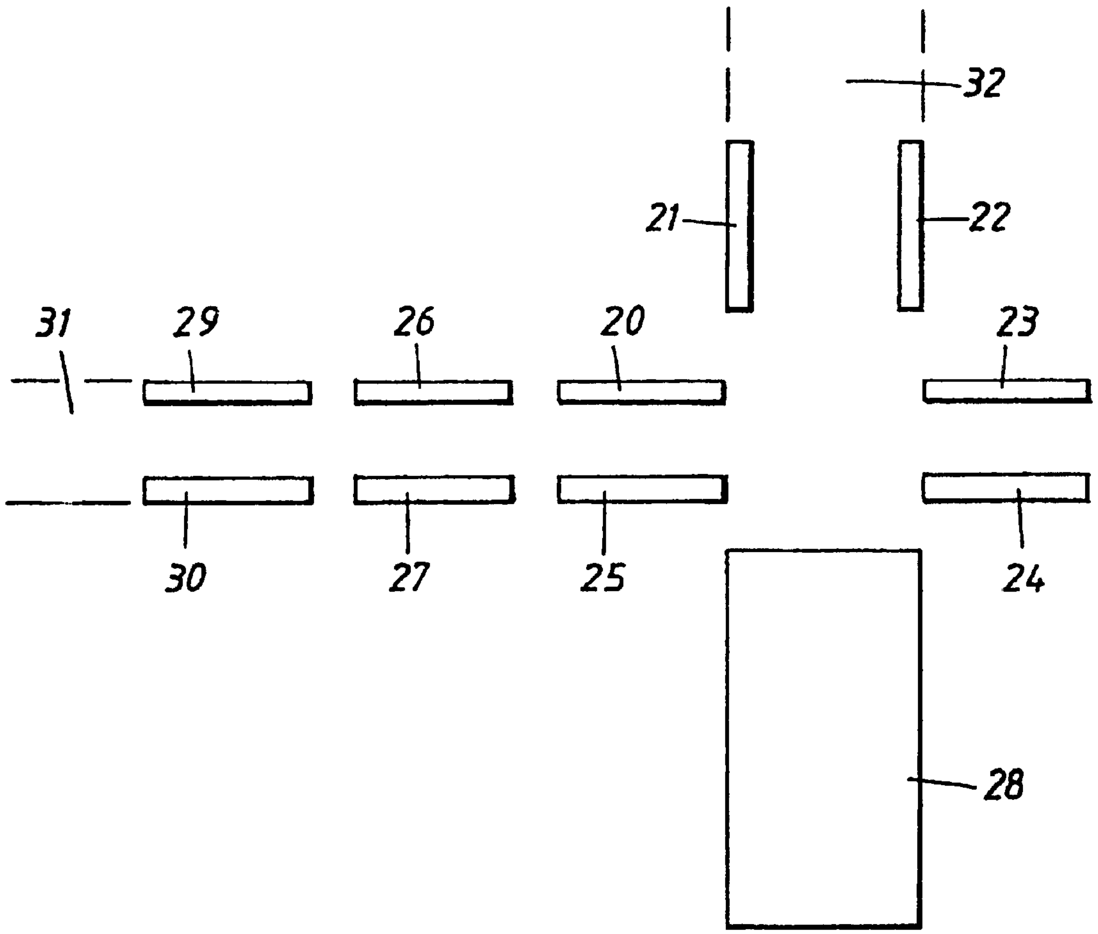
FIG. 3 is a schematic illustration of neighboring parking zones.

FIG. 3 illustrates as an example a number of parking zones 20–30 of mutually different sizes. The parking zones 20, 23–27, 29–30 may be situated along a street 31, whereas the parking zones 21, 22 may be situated along a side street 32. The parking zone 28 may be a large street-level parking area.

The memory of the control unit is suitably set to zero when the parking attendant or traffic warden begins his/her round. When the vehicle specific code of the first vehicle, for instance the vehicle registration number, is read, the code or number will not be present in the memory of said control unit, and hence the control unit will communicate with the system computer 6 and request a vehicle onsite parking list. Provided that the vehicle concerned has been reported as parked, the computer 6 pairs the code together with the parking zone in which the vehicle is parked. For instance, if the vehicle is parked in zone 20 an onsite parking list for zone 20 is thus sent to the control unit.

As a result of the transmission of information relating to neighboring zones; for instance zones 21–25, the total communication time between computer 6 and control unit 1 will be considerably shorter than when a separate communication is made for each zone. This is because the actual data transmission of the list takes up only a very small part of the total communications time-cycle.

When the parking attendant then comes into zone 21 or zone 23, for instance, and there reads a vehicle code, the vehicle will already be on the list in the computer of the control unit, provided that parking of the vehicle has earlier been reported, and hence communication with the computer 6 is unnecessary.

The number of onsite parking lists of neighboring zones that shall be fed into the control unit in conjunction with its communication with the computer 6 will be decided from case to case and will depend on the situation of the zones, the number of parking places per zone, and so on.

However, if the parking attendant then passes from zone 20 into zone 26, see FIG. 3, and there reads a vehicle code, the code will not be found in the control unit as being reported for parking, since no vehicle onsite parking list for zone 26 has been transferred to the control unit. The control unit then asks for a vehicle onsite parking list from the computer 6. The vehicle code is sent to the computer 6, which then pairs the vehicle code together with the zone 26 concerned, provided that the vehicle has been reported as parked in this zone. In this case, it is not only the vehicle onsite parking list for zone 26 that is sent to the control unit, but also corresponding lists for zones 20, 25, 27, 29, 30 for example which are then neighboring zones. The lists for zones 20, 25 will thus be updated at the same time.

Thus, the invention provides an adaptive process in which car onsite parking lists for relevant zones are obtained and updated in accordance with how the parking attendant moves in his/her control area.

According to one preferred embodiment of the invention, the aforesaid information relating to one or more parking zones that are geographically close to the parking zone concerned includes a part of the geographical area monitored by the parking attendant concerned or the whole of said geographical area.

According to one preferred embodiment of the invention, the control unit is adapted to compare a vehicle specific code read by said unit with the list stored in said unit and to send the code to said computer when the code is not found on the list. The computer 6 is adapted to check whether or not the code has been given as parked in another parking zone, and if such is not the case to send a signal to the control unit 1 signifying that the vehicle concerned has not been reported to the system as being parked, wherewith the control unit sends to the parking attendant a signal to the effect that the vehicle is not listed as being parked. This signal can be presented on the display or given as an acoustic signal or light signal from the control unit.

In the case of many parking zones, a vehicle is not considered to be wrongly parked if it has not been standing without payment for a period of time that is longer than a predetermined time period. A normal time in this respect is 10 minutes, during which a vehicle may be parked without needing to pay a parking fee.

When a vehicle that remains stationary within a relevant parking zone is not deemed to be wrongly parked until a period of time that exceeds a predetermined time period has expired, the control unit according to one preferred embodiment of the invention functions to store the read vehicle specific code together with the time at which the code was read. The control unit is also adapted to emit' a signal to the parking attendant when the aforesaid predetermined time period has expired.

In this respect, according to a first alternative, the parking attendant may again read the code of the vehicle, wherewith the control unit may be so adapted as to sense that the same vehicle code has been read two times and therewith ask the computer 6 whether the vehicle in question has been reported as being parked between the first and the second reading occasions. If such is not the case, the parking attendant issues a parking fine.

According to a second alternative, the control unit may be adapted to communicate with the computer 6 instead and therewith obtain a relevant list of parked vehicles when the predetermined time period has expired without requiring any particular action on the part of the parking attendant. When the vehicle is wrongly parked, a signal is sent to the parking attendant, whereas no signal is sent to the parking attendant when the new list relevant at that time includes the vehicle.

The control unit will preferably include a clock for this purpose. It is also preferred that the control unit will update the list in said control unit at regular time intervals, in addition to the aforedescribed updates. The time interval is conveniently chosen in accordance with the size of the parking zones, but will typically be about every twentieth minute.

Updating may take the form of erasing from the memory of the control unit those onsite car lists that are older than the predetermined time interval, for instance 20 minutes. In this regard, a new transmission of a relevant onsite car list takes place when a vehicle is next checked.

The control unit 1 may include a button 18 which is pressed by the parking attendant when a fine is issued. The vehicle code is stored in the memory of the control unit in this case. This information can be used for statistical data, among other things.

According to another preferred embodiment, the control unit is adapted so that when a vehicle specific code is read the code will be compared with the list stored in the control unit and when the code is found on the list, the control unit is adapted to send a signal to the parking attendant indicating that the vehicle is correctly parked.

It will be evident that the present invention shortens the communication time between control unit and computer and greatly reduces the number of button manipulations required from the parking attendants.

Although the invention has been described above with reference to a number of embodiments thereof, it will be understood that the system can be modified with respect to what can be considered as a neighboring parking zone and with respect to the information included in the communication between control unit and system computer.

The present invention shall not therefore be considered restricted to the aforedescribed embodiments, since variations and modifications can be made within the scope of the accompanying claims.

What is claimed is:

1. A parking control system in which a mobile telephone can be used to commence and terminate a parking period for a vehicle, wherein a user sends at least one user-specific code to a parking system computer belonging to said parking system at the commencement and termination of a parking period through the medium of a telephone system, wherein the parking system is informed of the parking zone concerned at the commencement of a parking period, wherein a machine-readable vehicle-specific code is stored in said computer and tied to the user-specific code, the parking control system comprising: a portable control unit including a reader to read a vehicle-specific code carried by the vehicle and to establish wireless communication with the parking system computer and retrieve information from the parking system computer concerning vehicle identification for vehicles that have commenced but not terminated parking within the parking zone concerned, wherein the parking system computer transmits to the control unit corresponding parked vehicle identification information relating to vehicles parked in at least one additional parking zone that is geographically close to the parking zone concerned at the same time as it sends the requested information to said control unit for the parking zone concerned.

2. A parking control system according to claim 1, wherein the control unit reads a vehicle-specific code and compares the code with the information received from the parking system computer and stored in the control unit and the read vehicle-specific code is not included in the information received from the parking system computer the computer checks whether or not the read code is stored in respect of a vehicle parked in another parking zone, and the parking system computer sends to the control unit information relating to vehicles parked in the at least one additional parking zone.

3. A parking control system according to claim 1, wherein the control unit compares the read vehicle-specific code with the information stored in the control unit and sends the code to said parking system computer when the read code is not found in the stored informnation; wherein the computer checks whether or not the read code has been stored in respect of a vehicle parked in another parking zone and to send to the control unit a signal indicating that the vehicle concerned has not been reported to the system as being parked, and wherein the control unit provides a signal to indicate that the vehicle has not been reported as being parked.

4. A parking control system according to claim 3, wherein when a vehicle has been parked for less than a given predetermined time period, the control unit stores the vehicle-specific code together with the time at which the code was read and provides a signal when said predetermined time period has expired.

5. A parking control system according to claim 3, wherein when a vehicle has been parked for a given predetermined time period within a particular parking zone, the control unit stores the vehicle-specific code together with the time at which the code was read and communicates with said parking system computer and retrieves a current list of parked vehicles when said predetermined time period has expired.

6. A parking control system according to claim 1, wherein when a vehicle-specific code is read, the control unit compares said code with the parking information stored in said control unit and, when the code is found sends a signal to the control unit indicating that the vehicle whose vehicle-specific code has been read is correctly parked.

7. A parking control system according to claim 1, wherein said information relating to the at least one parking zone geographically close to the parking zone concerned includes a part of an area monitored by a parking attendant.

8. A parking control system according to claim 1, wherein the telephone system is a mobile telephone system.

9. A parking control system according to claim 1, wherein the telephone system is a public switched telephone system.

10. A method of controlling parking in a parking system having a plurality of parking zones and having a parking system computer that is adapted to store parking-system user, vehicle, and parking time information and to communicate with a portable parking control unit carried by a parking attendant, said method comprising the steps of:

a) communicating by a parking system user to the parking system computer upon commencement of a parking period a user-specific code, a vehicle-specific code, and a specific parking zone identifier;

b) reading the vehicle-specific code with the portable control unit carried by the parking attendant and transmitting the read vehicle-specific code to the parking system computer along with the specific parking zone identifier; and c) transmitting from the parking system computer to the portable control unit carried by the parking attendant vehicle identification information relating to vehicles that have properly commenced a parking period within the specific parking zone and within additional parking zones geographically close to the specific parking zone to enable the parking attendant to verify that a particular vehicle had properly commenced a parking period within the parking system.

11. A method according to claim 10, wherein the vehicle-specific code is carried by the vehicle and is readable externally of the vehicle.

12. A method according to claim 10, wherein the parking zone identifier for a particular parking zone is a specific telephone number associated with the particular parking zone.

13. A method according to claim 10, wherein the communication is effected over a telephone network.

14. A method according to claim 13, wherein the telephone network is a mobile telephone network.

15. A method according to claim 10, wherein the vehicle-specific code is a vehicle registration number.

16. A method according to claim 10, including the step of comparing the sensed vehicle-specific code with parked-vehicle information stored in the parking system computer.

17. A method according to claim 16, wherein the parked-vehicle information includes information relating to vehicles parked for less than a predetermined time period, and including the step of transmitting a signal to the portable control unit when the predetermined time period has expired.

18. A method in accordance with claim 16, including the step of transmitting a signal from the parking system computer to the portable control unit when the sensed vehicle-specific code corresponds with that of a properly parked vehicle.

* * * * *